United States Patent
Arashin et al.

(10) Patent No.: US 8,386,603 B2
(45) Date of Patent: Feb. 26, 2013

(54) INFORMATION PROCESSING TERMINAL DEVICE AND NETWORK CONNECTION METHOD

(75) Inventors: Nobuhiko Arashin, Osaka (JP); Osamu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 215 days.

(21) Appl. No.: 13/063,116

(22) PCT Filed: Sep. 11, 2009

(86) PCT No.: PCT/JP2009/004520
§ 371 (c)(1),
(2), (4) Date: Mar. 9, 2011

(87) PCT Pub. No.: WO2010/029759
PCT Pub. Date: Mar. 18, 2010

(65) Prior Publication Data
US 2011/0191468 A1    Aug. 4, 2011

(30) Foreign Application Priority Data

Sep. 11, 2008  (JP) .................................. 2008-233859

(51) Int. Cl.
*G06F 15/16*    (2006.01)
(52) U.S. Cl. ........ 709/224; 709/223; 709/201; 709/213; 709/218; 709/219; 370/338; 370/399; 370/466; 370/389; 370/352
(58) Field of Classification Search .................. 709/224, 709/223, 201, 213, 218, 219, 249, 238, 222, 709/220
See application file for complete search history.

(56) References Cited

U.S. PATENT DOCUMENTS

| 7,366,769 B2 * | 4/2008 | Kaan et al. ..................... 709/218 |
| 7,395,354 B2 | 7/2008 | Keane et al. |
| 2003/0069947 A1 * | 4/2003 | Lipinski ........................ 709/220 |

(Continued)

FOREIGN PATENT DOCUMENTS

| JP | 2000-244601 | 9/2000 |
| JP | 2003-78541 | 3/2003 |
| JP | 2005-236480 | 9/2005 |
| JP | 2006-246412 | 9/2006 |

(Continued)

OTHER PUBLICATIONS

International Search Report issued Nov. 17, 2009 in International (PCT) Application No. PCT/JP2009/004520.

*Primary Examiner* — Jude Jean Gilles
(74) *Attorney, Agent, or Firm* — Wenderoth, Lind & Ponack, LLP

(57) ABSTRACT

An information processing terminal device (1) is provided which is reliably connectable to a desired server on the Internet and includes: a cable interface (3) that requests connection to a predetermined server; a connection information obtainment unit (4) that obtains, from the server, connection information which includes an IP address and is necessary for the connection to the server; an obtained IP address obtainment unit (8) that obtains the IP address assigned to a communication interface (2) connected to a different network; an IP address scheme determination unit (7) that determines whether or not the obtained IP address and the IP address included in the connection information have the same address scheme; an IP address setting management unit (6) that determines a method of setting the IP address and the connection information for the cable interface (3) and the communication interface (2); and a connection information setting unit (5) that sets and releases the IP address and the connection information according to the method determined by the IP address setting management unit.

17 Claims, 9 Drawing Sheets

U.S. PATENT DOCUMENTS

2004/0243722 A1  12/2004  Matsui
2006/0101026 A1* 5/2006  Fukushima .................. 707/100
2006/0198390 A1  9/2006  Shouno
2008/0052411 A1  2/2008  Iwaki et al.

FOREIGN PATENT DOCUMENTS

JP      2007-89019      4/2007
JP      2007-267407    10/2007

* cited by examiner

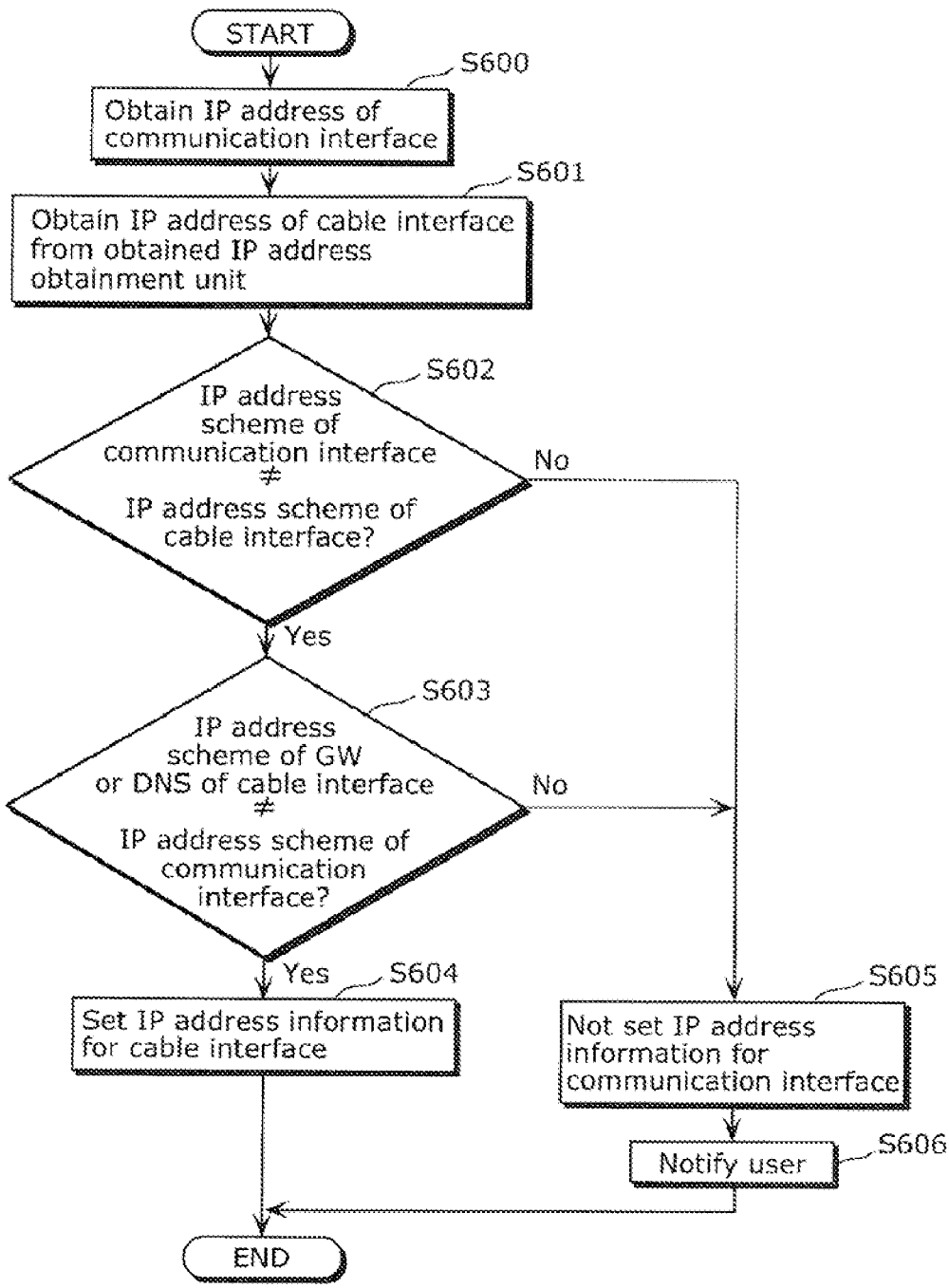

INFORMATION PROCESSING TERMINAL DEVICE AND NETWORK CONNECTION METHOD

TECHNICAL FIELD

The present invention relates to an information processing terminal device for use in a particular network environment.

BACKGROUND ART

In recent years, an improvement of home network infrastructure allows users to enjoy not only the Internet services provided from outside their homes by service providers, but also television programs recorded on hard disk drives (HDD) or the like using home networks. For example, an interface dedicated for services provided by a service provider from which content is received is connected to a home interface, and a user in another room enjoys the content in a home network.

In the case where a terminal has a plurality of interfaces as above, a failure to select an appropriate interface upon establishing communication may cause a failure to detect a target server or disconnection depending on a network environment, with the result that a user can no longer enjoy the services in the network or the content in the home network.

As an approach for solving such a problem, an information communication terminal device capable of selecting an optimum network path is disclosed (refer to PTL 1).

FIG. 1 shows a system configuration including a conventional information communication terminal device which selects a network path.

In an information communication terminal device 910, when a connection request is transmitted to a world wide web (WWW) server 23 and a WWW server 33 in given respective networks 21 and 31, one of a communication interface 911 and a communication interface 912 is selected which is designated in advance for a server to which the connection request is transmitted. Subsequently, a connection is established, via the selected one of the communication interface 911 and the communication interface 912, with a corresponding one of the network 21 and the network 31 in each of which a corresponding one of the WWW servers is provided, to obtain an Internet protocol (IP) address of the server from a device (a domain name system (DNS) server 22 or a DNS server 32) in the network. On the basis of the obtained IP address, a domain name registered and designated in advance for the WWW server, the communication interface 911, and the communication interface 912, a connection is then established with the WWW server.

[Citation List]
[Patent Literature]
[PTL 1]
Japanese Unexamined Patent Application Publication No. JP-A 2005-236480

SUMMARY OF INVENTION

Technical Problem

However, in the information communication terminal device 910 with the above conventional structure, even when the domain name and the interface are registered in advance so that the services can be provided via a particular interface, actual access to the WWW server requires obtaining, from the DNS server, the IP address of the server to which a connection is to be established, and establishing the connection with use of the obtained IP address. This may cause a failure in the information communication terminal device 910 to select an appropriate communication path and an appropriate interface, in the case where the domain to which the WWW server belongs is a domain which has the same IP address scheme as the information communication terminal device 910.

An object of the present invention is to provide, in view of the above conventional problem, a device which includes a plurality of communication interfaces and is capable of selecting an appropriate one of the communication interfaces and receiving a service.

Solution to Problem

In order to solve the above problem, the information processing terminal device according to an aspect of the present invention includes: a plurality of communication interfaces that request connection to networks different from each other and obtain, from Dynamic Host Configuration Protocol (DHCP) servers corresponding to the respective networks, connection information that includes Internet Protocol (IP) addresses and is necessary for the connection to the networks; an IP address scheme determination unit configured to determine whether or not the IP addresses that are included in the connection information obtained by two of the communication interfaces are IP addresses having the same address scheme; and a connection information setting unit configured to set, for only one of the two communication interfaces, a corresponding one of the IP addresses when the IP address scheme determination unit determines that the IP addresses that are included in the connection information obtained by the two communication interfaces are the IP addresses having the same address scheme.

Furthermore, the IP address scheme determination unit may be configured to (i) obtain subnet addresses for the two communication interfaces, (ii) compare the obtained subnet addresses, and (iii) determine the two IP addresses as having the same address scheme when the subnet addresses have an inclusion relation, the subnet addresses each being obtained by a logical AND operation between a corresponding one of the IP addresses and a subnet mask corresponding to the IP address.

Furthermore, the information processing terminal device may further include: in the case where, of the two communication interfaces, a communication interface for which a corresponding one of the IP addresses is set first is referred to as a first communication interface, and a communication interface which obtains the connection information after the first communication interface does is referred to as a second communication interface, an obtained IP address obtainment unit configured to obtain, from the first communication interface, the IP address which has already been set for the first communication interface; and an IP address setting management unit configured to determine a method of setting a corresponding one of the IP addresses for only one of the two communication interfaces when the IP address scheme determination unit determines that the IP address obtained by the obtained IP address obtainment unit and the IP address obtained by the second communication interface are the IP addresses having the same address scheme, wherein the connection information setting unit is configured to set the IP addresses and the connection information for the communication interfaces according to the method determined by the IP address setting management unit.

Furthermore, the IP address setting management unit may be configured to determine not to set the obtained IP address for the second communication interface when the IP address scheme determination unit determines that the IP address obtained by the obtained IP address obtainment unit and the IP address that is included in the connection information obtained by the second communication interface have the same IP address scheme.

Furthermore, the IP address setting management unit may further be configured to determine to set the obtained IP address also for the second communication interface when the IP address scheme determination unit determines that the IP address obtained by the obtained IP address obtainment unit and the IP address that is included in the connection information obtained by the second communication interface do not have the same IP address scheme.

Furthermore, the information processing terminal device may further include a notification unit configured to notify a user that the IP address that is included in the connection information obtained later is not set for the second communication interface.

Furthermore, when the IP address scheme determination unit determines that the IP address obtained by the obtained IP address obtainment unit and the IP address that is included in the connection information obtained by the second communication interface have the same IP address scheme, the IP address setting management unit may be configured to (i) release the IP address obtained by the obtained IP address obtainment unit, from the first communication interface for which the IP address obtained by the obtained IP address obtainment unit has been set, and (ii) determine to set, for the second communication interface, the IP address included in the obtained connection information.

Furthermore, the information processing terminal device may further include a notification unit configured to notify a user that the IP address that is included in the connection information and has been set for the first communication interface is released.

Furthermore, in the case where the communication interface defined as the LAN interface is the first communication interface for which a corresponding one of the IP addresses is set first, the IP address setting management unit may be configured to determine to set, for the first communication interface, neither the gateway information nor the Domain Name System (DNS) server information that is necessary for the first communication interface to connect to an external server and is included in the connection information for the first communication interface.

Furthermore, the two communication interfaces are a Wide Area Network (WAN) interface and a Local Area Network (LAN) interface, and in the case where the LAN interface is the first communication interface for which a corresponding one of the IP addresses has already been set, the IP address setting management unit may be configured to determine to set, for the second communication interface, neither the gateway information nor the DNS server information that is included in the connection information obtained later when the IP address scheme determination unit determines that the IP address obtained by the obtained IP address obtainment unit and at least one of the gateway information and the DNS server information that are included in the connection information obtained by the second communication interface that is the WAN interface have the same IP address scheme.

Furthermore, the two communication interfaces are a WAN interface and a LAN interface, and in the case where the LAN interface is the first communication interface for which a corresponding one of the IP addresses has already been set and the WAN interface is the second communication interface, the IP address setting management unit may be configured to determine to (i) release the IP address which has already been set for the first communication interface, and (ii) set, for the second communication interface, the IP address that is included in the connection information obtained later, when the IP address scheme determination unit determines that the IP address obtained by the obtained IP address obtainment unit and at least one of the gateway information and the DNS server information that are included in the connection information obtained by the second communication interface that is the WAN interface have the same IP address scheme.

Furthermore, the two communication interfaces may be a WAN interface and a LAN interface, and in the case where the WAN interface is the first communication interface for which a corresponding one of the IP addresses has already been set and the LAN interface is the second communication interface, the IP address setting management unit may be configured to determine not to set, for the second communication interface, the IP address obtained later, when the IP address scheme determination unit determines that the IP address which a router assigns the second communication interface after assigning the first communication interface and at least one of the gateway information and the DNS server information which have already been set for the first communication interface have the same IP address scheme.

Furthermore, when the IP address scheme determination unit determines that the IP address which a router assigns one of the two communication interfaces and at least one of the gateway information and the DNS server information that are included in the connection information obtained by the other one of the two communication interfaces have the same IP address scheme, the IP address setting management unit may be configured to determine for which of the two communication interfaces a corresponding one of the IP addresses is to be set, according to which network an application to be executed is provided from.

Furthermore, in the case where the two communication interfaces are a WAN interface and a LAN interface, a corresponding one of the IP addresses, the gateway information, and the DNS server information has already been set for the WAN interface, and the router then assigns a corresponding one of the IP addresses to the LAN interface, when the IP address scheme determination unit determines that the IP address which the router assigns the LAN interface and at least one of the gateway information and the DNS server information which have already been set for the WAN interface have the same IP address scheme, the IP address setting management unit may be configured to determine to (i) release the IP address which has already been set for the WAN interface and (ii) set, for the LAN interface, the IP address obtained later, when the information processing terminal device executes a LAN application.

As above, the present invention enables assigning two communication interfaces with IP addresses having schemes that are different from each other without exception, thereby preventing erroneous data transmission inside an information processing terminal device and accurately establishing a connection with a desired server even when a plurality of communication interfaces are used at the same time.

It is to be noted that the present invention can be implemented not only as a device, but also as a method which includes processing means of the device as steps, a program which causes a computer to execute these steps, a computer-readable recording medium such as a CD-ROM on which the program is recorded, and information, data, or a signal which indicates the program. These program, information, data, and signal may be distributed via a communication network such as the Internet.

Advantageous Effects of Invention

The present invention provides an information processing terminal device which is capable of providing a service through an appropriate communication interface in the case of having a plurality of communication interfaces.

BRIEF DESCRIPTION OF DRAWINGS

FIG. 9 is a flowchart showing an operation of an information processing terminal device according to the sixth embodiment.

DESCRIPTION OF EMBODIMENTS

With reference to the drawings, the following describes the best embodiments to implement the present invention.
(First Embodiment)

Figure 1:
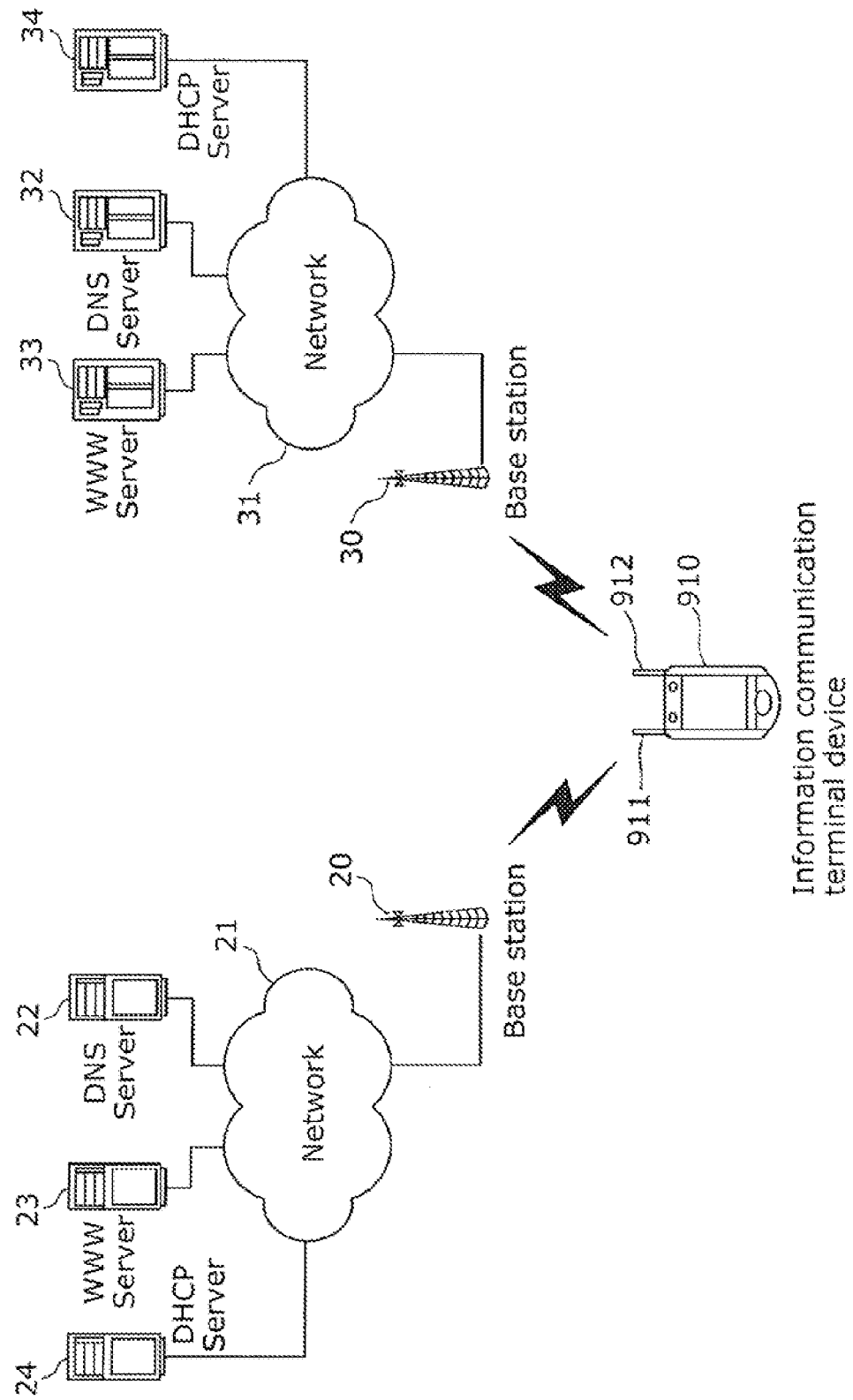
FIG. 1 shows a system configuration including a conventional information communication terminal device which selects a network path.
Figure 2:
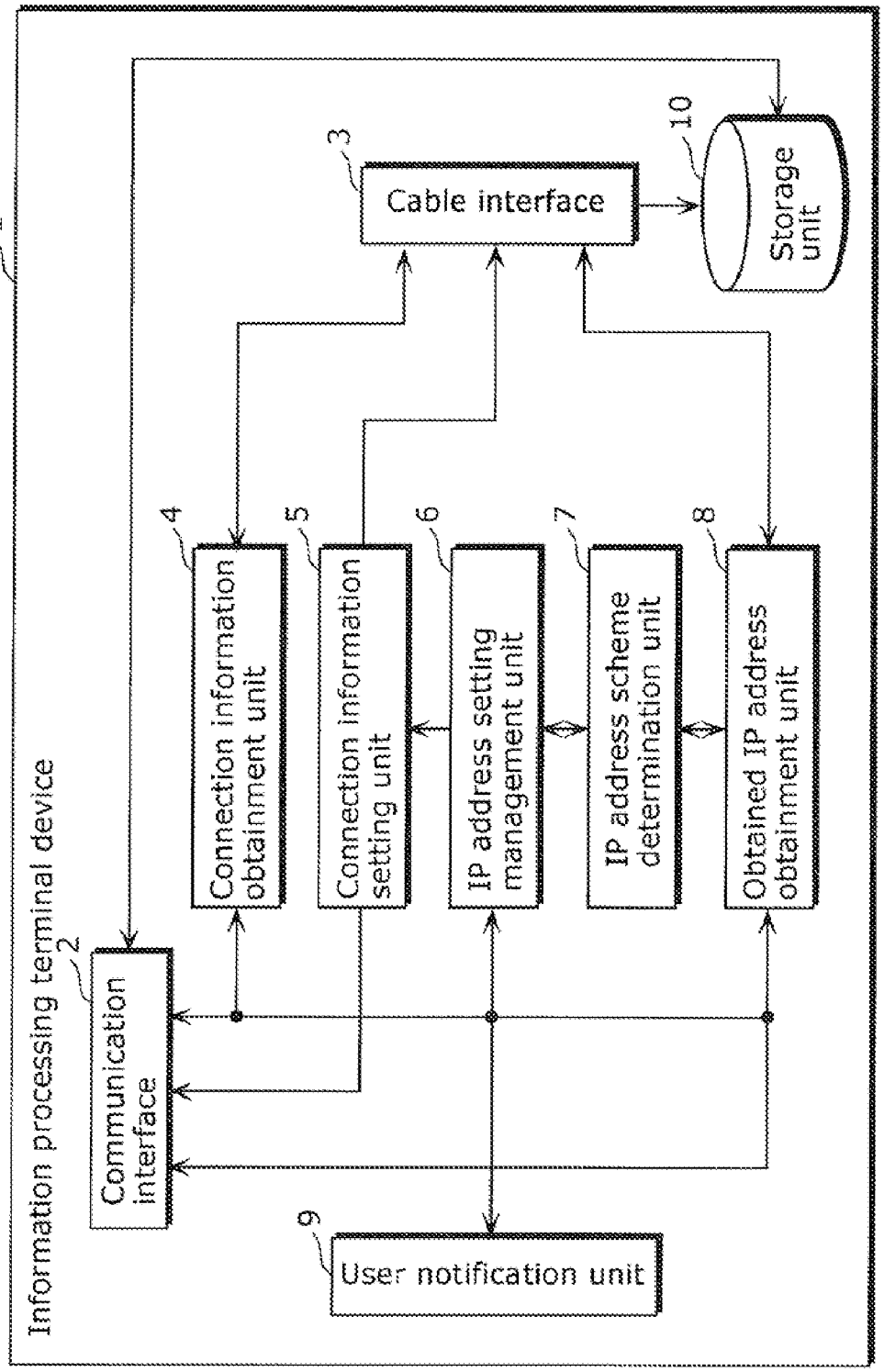
FIG. 2 is a block diagram showing a structure of an information processing terminal device according to the first embodiment.
Figure 3:
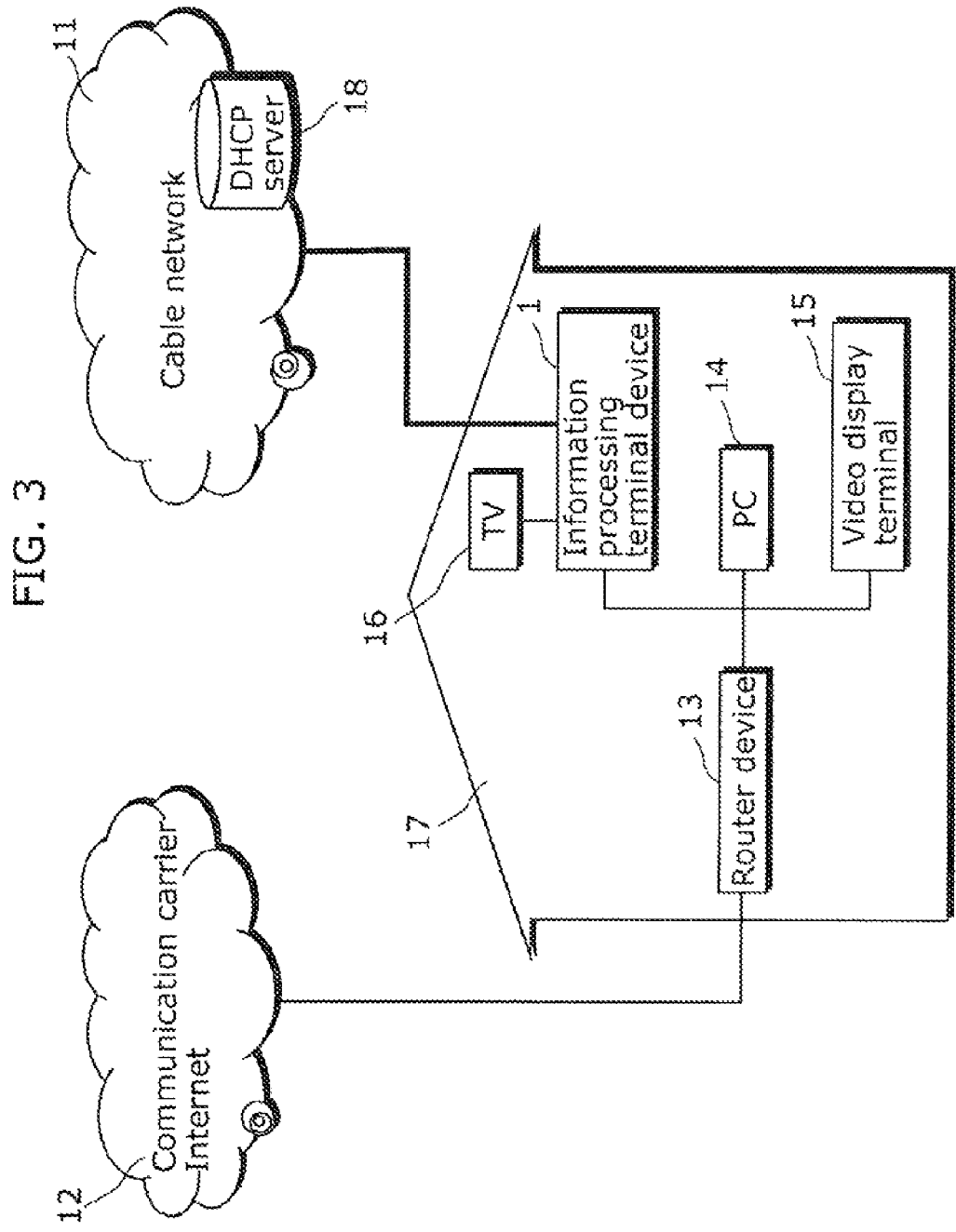
FIG. 3 shows an example of a system configuration including the information processing terminal device according to the first embodiment.

FIG. 2 is a block diagram showing a structure of an information processing terminal device 1 according to the first embodiment, and FIG. 3 shows an example of a system configuration including the information processing terminal device 1 according to the first embodiment.

The information processing terminal device 1 according to the first embodiment is an example of the information processing terminal device according to an implementation of the present invention which includes a plurality of communication interfaces connectable to networks and receives information from servers in the networks, and the information processing terminal device 1 (i) compares an IP address of a communication interface of which IP address is assigned by a home router, with an IP address of a cable interface which receives the IP address directly from a server in the network and (ii) sets IP address information for both of the interfaces only when the schemes of the IP addresses are different, and does not set the IP address information for the communication interface when the schemes of the IP addresses are the same. It is to be noted that the schemes of the IP addresses being the same herein means that the subnet addresses of the IP addresses have an inclusion relation. As shown in FIG. 2, the information processing terminal device 1 includes a communication interface 2, a cable interface 3, a connection information obtainment unit 4, a connection information setting unit 5, an IP address setting management unit 6, an IP address scheme determination unit 7, an obtained IP address obtainment unit 8, a user notification unit 9, and a storage unit 10.

The information processing terminal device 1 as above is placed in a house 17 as shown in FIG. 3. The information processing terminal device 1 is connected to a cable network 11 via the cable interface 3 shown in FIG. 2, and receives broadcast signals over a cable to display them on a television (TV) 16 or to record programs on the storage unit 10 included in the device. Furthermore, the cable interface 3 can be connected to the Internet by using the cable Internet in the cable network 11. The cable interface 3 is an example of "a plurality of communication interfaces that request connection to networks different from each other and obtain, from Dynamic Host Configuration Protocol (DHCP) servers corresponding to the respective networks, connection information that includes Internet Protocol (IP) addresses and is necessary for the connection to the networks". While the cable interface 3 is explained herein as an example of an interface through which an IP address is obtained directly from a dynamic host configuration protocol (DHCP) server 18 to establish a connection with the Internet in the cable network 11, the present invention is not limited to this example, and the information processing terminal device 1 may use a wide area network (WAN) interface through which a connection with the Internet is established via the WAN.

Still furthermore, the information processing terminal device 1 includes the communication interface 2 in order to use the home network. This makes it possible to execute, for example, a home application as defined by digital living network alliance (DLNA) (including distribution, via the home network, of programs recorded on the storage unit 10 to a PC 14 and a network-compatible video display terminal 15 that are present in the house 17).

The communication interface 2 is an example of "a plurality of communication interfaces that request connection to networks different from each other and obtain, from Dynamic Host Configuration Protocol (DHCP) servers corresponding to the respective networks, connection information that includes Internet Protocol (IP) addresses and is necessary for the connection to the networks".

As shown in FIG. 2, the information processing terminal device 1 includes a plurality of interfaces, for example, the communication interface 2 and the cable interface 3.

The communication interface exists only for obtaining the IP address from the DHCP server in a router device 13 in the house and executing the DLNA. This interface is not used to establish a connection with the Internet network. A connection with the Internet network is established through the cable interface only.

In order to simplify explanation, suppose herein that the information processing terminal device 1 is a device such as a set-top box provided by a cable operator and that the interface through which a connection with the Internet network is established must be the cable interface 3. This means that the information processing terminal device 1 cannot receive desired service provided by a cable operator, such as the Internet and content including moving pictures, music, and the like, without using the cable interface 3.

Next, the block configuration of the information processing terminal device 1 shown in FIG. 2 is described.

The communication interface 2 is an interface for distributing program data stored in the storage unit 10 to a terminal device connected to the home network. The cable interface 3 is an interface through which a connection with the cable network 11 is established. The connection information obtainment unit 4 obtains connection information (which may also hereinafter be referred to as "IP address information") from the DHCP server 18 in the cable network 11 by issuing, to the DHCP server 18, a request for the IP address information upon a start of the information processing terminal device 1 or when triggered by a user. The connection information obtainment unit 4 is an example of "a communication interface that requests connection to a network and obtains, from a DHCP server corresponding to the network, connection information that includes an IP address and is necessary for the connection to the network". The obtained IP address obtainment unit 8 obtains, from a first interface (for example, the communication interface 2), an IP address which has already been obtained by the first interface (for example, the communication interface 2) other than a second interface (for example, the cable interface 3) which has received the connection request. The obtained IP address obtainment unit 8 is an example of "in the case where, of the two communication interfaces, a communication interface for which a corresponding one of the IP addresses is set first is referred to as a first communication interface, and a communication interface which obtains the connection information after the first communication interface does is referred to as a second communication interface, an obtained IP address obtainment unit configured to obtain, from the first communication interface, the IP address which has already been set for the first communication interface". Although the above describes that the communication interface 2 has been assigned an IP address before the cable interface 3 requests connection, the present invention is not limited to the above. For example, it may be possible that the cable interface 3 has obtained connection information including an IP address before the router device 13 assigns the communication interface 2 with an IP address. In this case, the obtained IP address obtainment unit 8 obtains the IP address included in the connection information which has been set for the cable interface 3. The IP address scheme determination unit 7 determines whether or not the IP addresses obtained by the obtained IP address obtainment unit 8 include any IP addresses with the same scheme as the IP address included in the connection information obtained by the connection information obtainment unit 4. The IP address scheme determination unit 7 is an example of "an IP address scheme determination unit configured to determine whether or not the IP addresses that are included in the connection information obtained by two of the communication interfaces are IP addresses having the same address scheme" and "the IP address scheme determination unit configured to (i) obtain subnet addresses for the two communication interfaces, (ii) compare the obtained subnet addresses, and (iii) determine the two IP addresses as having the same address scheme when the subnet addresses have an inclusion relation, the subnet addresses each being obtained by a logical AND operation between a corresponding one of the IP addresses and a subnet mask corresponding to the IP address". For example, when the high-order 24 bits of the IP addresses are the same, the IP address scheme determination unit 7 determines that the IP address obtained by the obtained IP address obtainment unit 8 and the IP address obtained by the connection information obtainment unit 4 have the same IP address scheme. Furthermore, also when, for example, the IP address which the cable interface obtains from the DHCP server in the cable network is 10.78.45.100 with a subnet mask of 255.255.255.0, and the IP address which the communication interface obtains from the router device is 10.78.45.101 with a subnet mask of 255.255.0.0, these are determined as having the same IP address scheme. That is, the subnet address of the cable interface can be obtained by performing a logical AND operation between the IP address "10.78.45.100" and the subnet mask "255.255.255.0". Thus, the subnet address of the cable interface is "10.78.45.0". In the meantime, the subnet address of the communication interface can be obtained by performing a logical AND operation between the IP address "10.78.45.101" and the subnet mask "255.255.0.0". Thus, the subnet address of the communication interface is "10.78.0.0". This makes a determination that the subnet address "10.78.45.0" of the cable interface is included in the subnet address "10.78.0.0" of the communication interface, that is, these addresses have an inclusion relation. In sum, the IP address scheme determination unit 7 determines subnet addresses being the same or having an inclusion relation as the same as the IP addresses having the same scheme.

The IP address setting management unit 6 manages setting of the IP addresses of the respective interfaces according to the determination results of the IP address scheme determination unit 7. Specifically, the IP address setting management unit 6 manages setting of the IP addresses so that user interfaces other than the cable interface 3 that has received a connection request are not given IP address information with the same scheme as the IP address assigned to the cable interface 3. The IP address setting management unit 6 is an example of "an IP address setting management unit configured to determine a method of setting a corresponding one of the IP addresses for only one of the two communication interfaces when the IP address scheme determination unit determines that the IP address obtained by the obtained IP address obtainment unit and the IP address obtained by the second communication interface are the IP addresses having the same address scheme" and "the IP address setting management unit configured to determine not to set the obtained IP address for the second communication interface when the IP address scheme determination unit determines that the IP address obtained by the obtained IP address obtainment unit and the IP address that is included in the connection information obtained by the second communication interface have the same IP address scheme". The connection information setting unit 5 sets and releases connection information for the interfaces according to the IP address setting management unit 6. The connection information setting unit 5 is an example of "a connection information setting unit configured to set, for only one of the two communication interfaces, a corresponding one of the IP addresses when the IP address scheme determination unit determines that the IP addresses that are included in the connection information obtained by the two communication interfaces are the IP addresses having the same address scheme" and "the connection information setting unit configured to set the IP addresses and the connection information for the communication interfaces according to the method determined by the IP address setting management unit". The user notification unit 9 is an example of "a notification unit configured to notify a user that the IP address that is included in the connection information obtained later is not set for the second communication interface". The user notification unit 9 notifies a user of a setting status of the IP address information to the interfaces, according to the IP address setting management unit 6.

Figure 4:
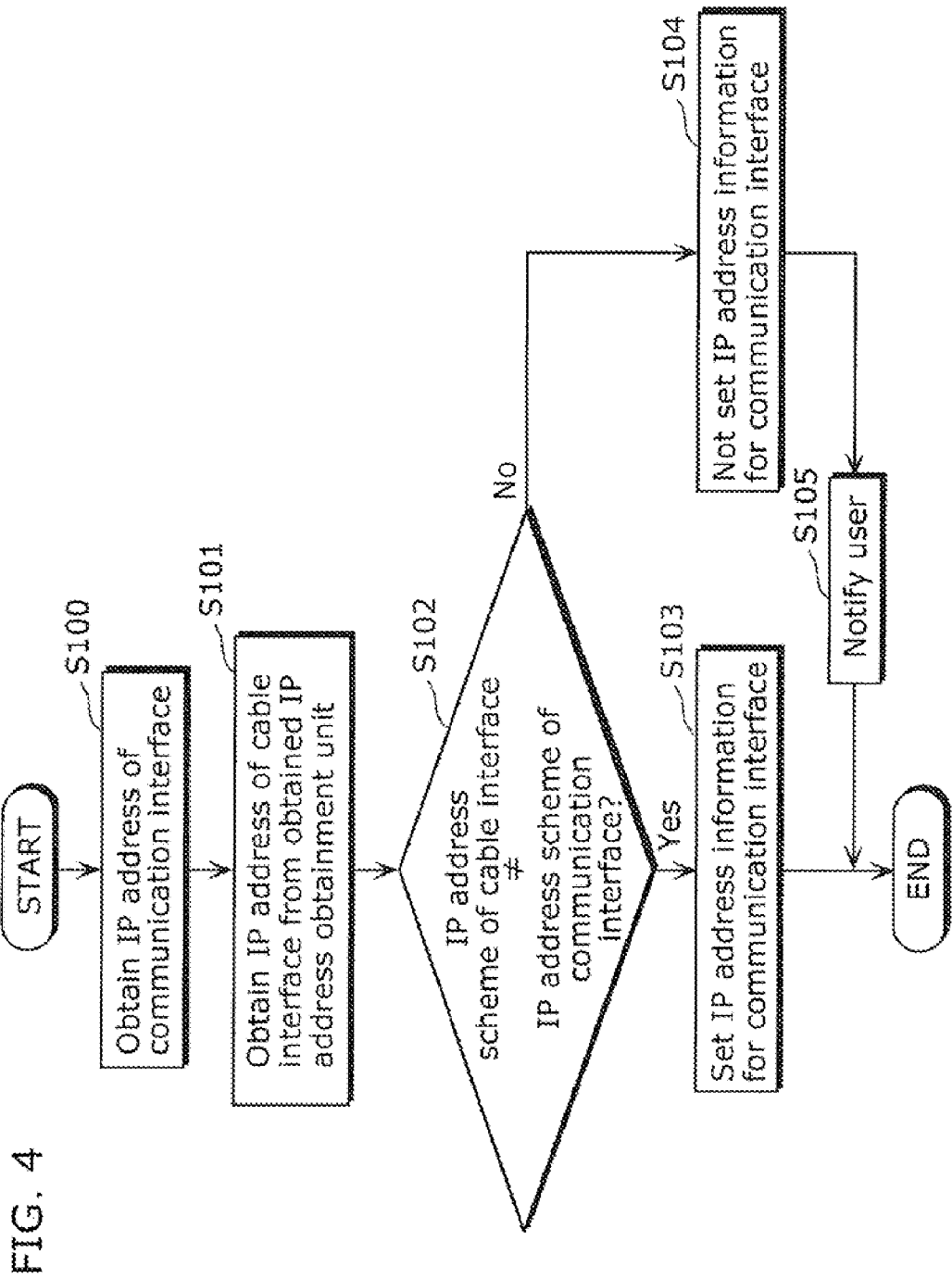
FIG. 4 is a flowchart showing an operation at the time of obtaining an IP address in the information processing terminal device according to the first embodiment.

Next, referring to the flowchart of FIG. 4, behavior of the information processing terminal device 1 in obtaining the IP address is described. FIG. 4 is a flowchart showing an operation at the time of obtaining an IP address in the information processing terminal device 1 according to the first embodiment. Suppose the case where the information processing terminal device 1 has already obtained the IP address of the cable interface 3. For example, suppose that the IP address of the cable interface 3 is 10.78.45.20/24.

When the cable interface 3 obtains an IP address, then the IP address setting management unit 6 attempts to obtain, using the connection information obtainment unit 4, an IP address of the communication interface 2 from the DHCP server 18 in the router device 13 and to set the obtained IP address information for the communication interface 2 (S100). When the communication interface 2 attempts to obtain an IP address, the router device 13 attempts to assign the communication interface 2 with an IP address. After the IP address is received from the router device 13, the IP address setting management unit 6 obtains the IP address of the cable interface 3 from the obtained IP address obtainment unit 8 (S101).

The IP address scheme determination unit 7 then determines, by comparison, whether or not the scheme of the IP address which the router device 13 attempts to provide to the communication interface 2 is different from the scheme of the IP address of the cable interface 3 obtained by the obtained IP address obtainment unit 8 (S102).

When the IP address which the router device 13 attempts to provide to the communication interface 2 is 10.78.45.40/24, no IP address information is set for the communication interface 2 (S104) because the IP address has the same IP address scheme as the IP address of the cable interface 3 (No in S102). The user notification unit 9 is then used to notify a user that no IP address information is set for the communication interface 2 (S105).

When the IP address which the router device 13 attempts to provide to the communication interface 2 is 192.168.0.10/24, the IP address information provided from the router device 13 is set for the communication interface 2 (S103) because the IP address has a different IP address scheme from the IP address of the cable interface 3 (Yes in S102).

The use of the above method ensures that the cable interface 3 is always given IP address information which is different in scheme from the IP address of the communication interface 2, allowing a connection to be reliably established with a desired WWW server in the cable network 11 by way of the cable interface 3. That is, because the IP addresses that are set for the respective interfaces always have different schemes, these interfaces can be correctly distinguished in the information processing terminal device 1 when the information processing terminal device 1 performs communication. This eliminates confusion about to which interface data is to be transmitted, and there is no longer a failure to select an appropriate interface due to overlapping IP address schemes.

Although the above describes the use of the DHCP at the time when the communication interface 2 obtains an IP address, this may be of course replaced by user's setting of a fixed IP address.

Furthermore, after the connection with the cable network 11 by way of the cable interface 3 is terminated, the IP address setting management unit 6 may set, using the connection information obtainment unit 4, an IP address which has not been set in Step S104, for the communication interface 2, to use the home network.

(Second Embodiment)

Figure 5:
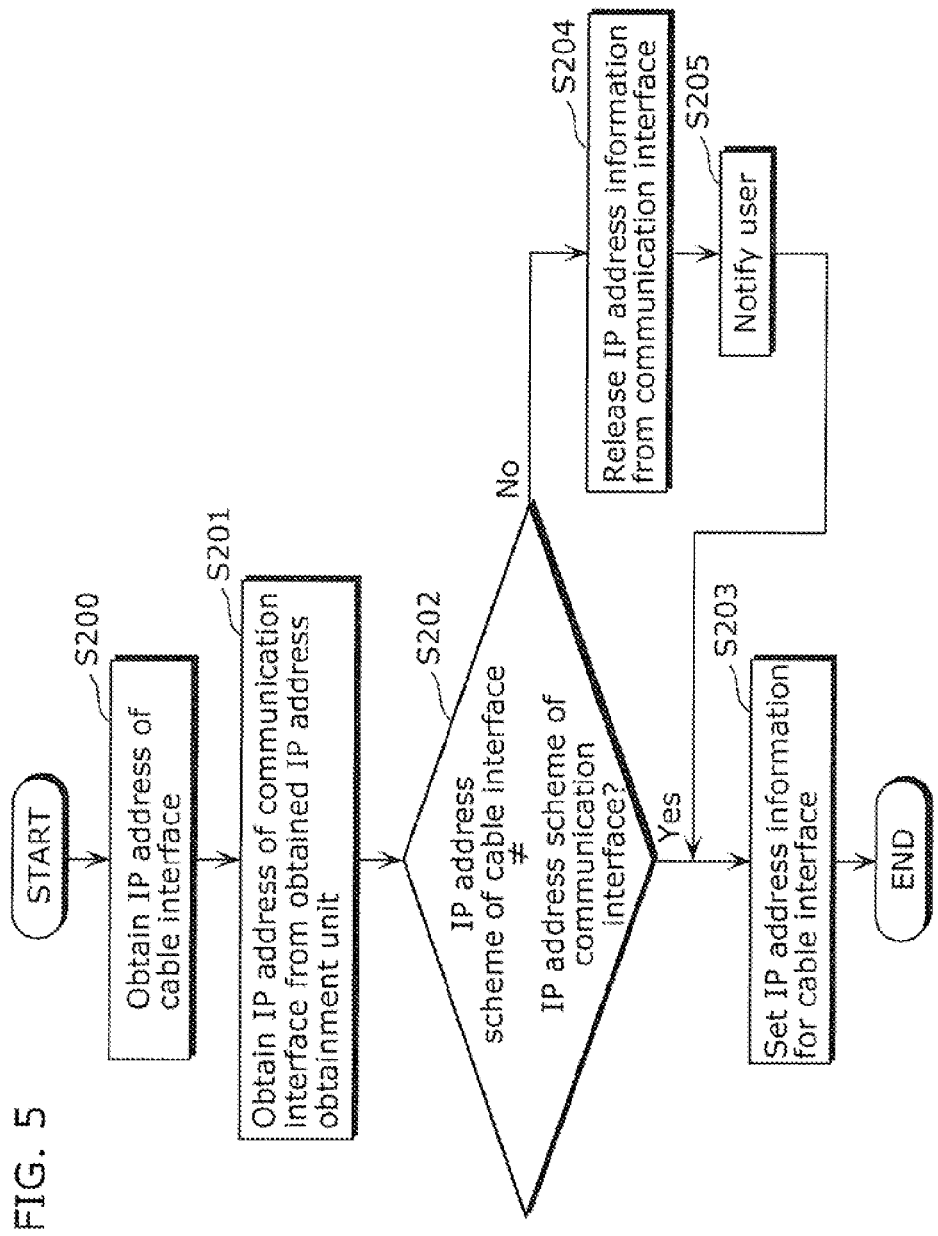
FIG. 5 is a flowchart showing an operation of an information processing terminal device according to the second embodiment.

The second embodiment describes, referring to the flowchart of FIG. 5, behavior of the information processing terminal device 1 at the time when the cable interface 3 obtains an IP address in the case where the communication interface 2 has already obtained an IP address from the router device 13. In the second embodiment, what differs significantly from the first embodiment is that the IP address of the communication interface 2 is obtained before the IP address of the cable interface 3 is obtained. In the case where the two IP addresses have the same IP address scheme, the IP address of the communication interface 2 is therefore released. FIG. 5 is a flowchart showing an operation of the information processing terminal device 1 according to the second embodiment. As an example, suppose that the IP address which the communication interface 2 has already obtained is 10.78.45.22/24.

When the communication interface 2 obtains the IP address, then the IP address setting management unit 6 attempts to set, using the connection information obtainment unit 4, IP address information provided by the DHCP server 18, for the cable interface 3 (S200).

When the cable interface 3 attempts to obtain an IP address, the DHCP server 18 in the cable network attempts to assign the cable interface 3 with an IP address. After the IP address is received from the DHCP server 18, the IP address setting management unit 6 obtains the IP address of the communication interface 2 from the obtained IP address obtainment unit 8 (S201).

The IP address scheme determination unit 7 then determines, by comparison, whether or not the scheme of the IP address which the DHCP server 18 attempts to provide to the cable interface 3 is different from the scheme of the IP address of the communication interface 2 obtained by the obtained IP address obtainment unit 8 (S202).

When the IP address which the DHCP server 18 attempts to provide to the cable interface 3 is 10.78.45.40/24, the IP address setting management unit 6 and the connection information setting unit 5 release the IP address from the communication interface 2 (S204) because the IP address has the same IP address scheme as the IP address of the communication interface 2 (No in S202). The IP address setting management unit 6 and the connection information setting unit 5 are an example of "when the IP address scheme determination unit determines that the IP address obtained by the obtained IP address obtainment unit and the IP address that is included in the connection information obtained by the second communication interface have the same IP address scheme, the IP address setting management unit configured to (i) release the IP address obtained by the obtained IP address obtainment unit, from the first communication interface for which the IP address obtained by the obtained IP address obtainment unit has been set, and (ii) determine to set, for the second communication interface, the IP address included in the obtained connection information". The user notification unit 9 is then used to notify a user that the IP address of the communication interface 2 is released (S205). The user notification unit 9 is an example of "a notification unit configured to notify a user that the IP address that is included in the connection information and has been set for the first communication interface is released". The IP address information is then set for the cable interface 3 (S203).

When the IP address which the DHCP server 18 attempts to provide to the cable interface 3 is 10.10.10.20/24, the IP address information is set for the cable interface 3 (S203) because the IP address has a different IP address scheme from the IP address of the communication interface 2 (Yes in S202).

The use of the above method ensures that the respective interfaces are always given the IP addresses with different schemes and that, when the information processing terminal device 1 receives services provided by a cable operator, there are no longer confusion about to which interface data is to be transmitted and no longer a failure to select an appropriate interface due to overlapping IP address schemes.

Also in this case, like the first embodiment, in the case where the IP address of the communication interface 2 has been released, after the connection with the cable network 11 by way of the cable interface 3 is terminated, an IP address may be obtained from the router device 13 and set for the communication interface 2 through the control of the IP address setting management unit 6 to use the home network.

(Third Embodiment)

Figure 6:
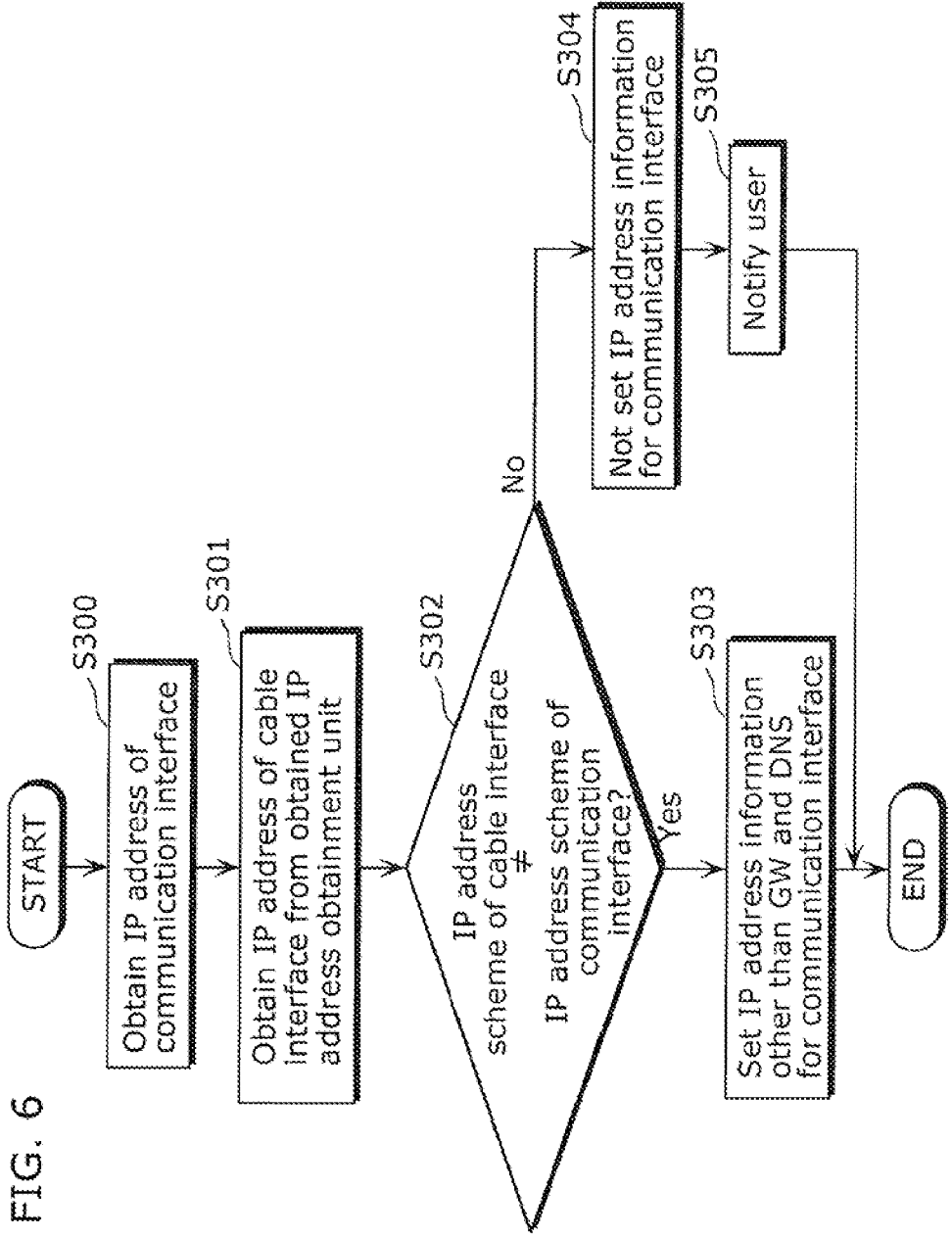
FIG. 6 is a flowchart showing an operation of an information processing terminal device according to the third embodiment.

The third embodiment describes, referring to the flowchart of FIG. 6, behavior of the information processing terminal device 1 at the time when the communication interface 2 obtains an IP address in the case where the cable interface 3 has already obtained an IP address from the DHCP server 18. The present third embodiment 3 is different from the above first and second embodiments in that, even when the IP addresses of the communication interface 2 and the cable interface 3 have different schemes, the IP address information necessary for the Internet connection is not set for the communication interface 2. FIG. 6 is a flowchart showing an operation of the information processing terminal device 1 according to the third embodiment.

Now, suppose that the IP address which the cable interface 3 has already obtained is 10.78.45.22/24. When the cable interface 3 obtains the IP address, then the IP address setting management unit 6 attempts to set, using the connection information obtainment unit 4, IP address information provided by DHCP, for the communication interface 2 (S300).

When the communication interface 2 attempts to obtain an IP address, the router device 13 attempts to assign the communication interface 2 with an IP address. After the IP address is received from the router device 13, the IP address setting management unit 6 obtains the IP address of the cable interface 3 from the obtained IP address obtainment unit 8 (S301).

The IP address scheme determination unit 7 then determines, by comparison, whether or not the scheme of the IP address which the router device 13 attempts to provide to the communication interface 2 is different from the scheme of the IP address of the cable interface 3 obtained by the obtained IP address obtainment unit 8 (S302).

When the IP address which the router device 13 attempts to provide to the communication interface 2 is 10.78.45.40/24, no IP address information is set for the communication interface 2 (S304) because the IP address has the same IP address scheme as the IP address of the cable interface 3 (No in S302). The user notification unit 9 is then used to notify a user that no IP address information is set for the communication interface 2 (S305).

When the IP address which the router device 13 attempts to provide to the communication interface 2 is 192.168.0.10/24, only the IP address is set for the communication interface 2 because the IP address has a different IP address scheme from the IP address of the cable interface 3 (Yes in S302). Although there is other information which the router device 13 sets for the communication interface 2, such as gateway (GW) information and DNS information that are necessary for connection to the Internet network provided by a carrier, these are not set but only the IP address is set for the communication interface 2 (S303). The IP address setting management unit 6 is an example of "in the case where the communication interface defined as the LAN interface is the first communication interface for which a corresponding one of the IP addresses is set first, the IP address setting management unit configured to determine to set, for the first communication interface, neither the gateway information nor the Domain Name System (DNS) server information that is necessary for the first communication interface to connect to an external server and is included in the connection information for the first communication interface".

The use of the above method ensures that the respective interfaces are always given the IP addresses with different schemes, with the result that there is no longer confusion about to which interface data is to be transmitted when the information processing terminal device 1 performs communication and that, when a connection is established with the Internet, the connection via the communication interface 2 can be avoided. Furthermore, there is no longer a failure to select an appropriate interface due to overlapping IP address schemes.

Although the above describes the use of the DHCP at the time when the communication interface 2 obtains an IP address, this may be of course replaced by user's setting of a fixed IP address.

(Fourth Embodiment)

Figure 7:
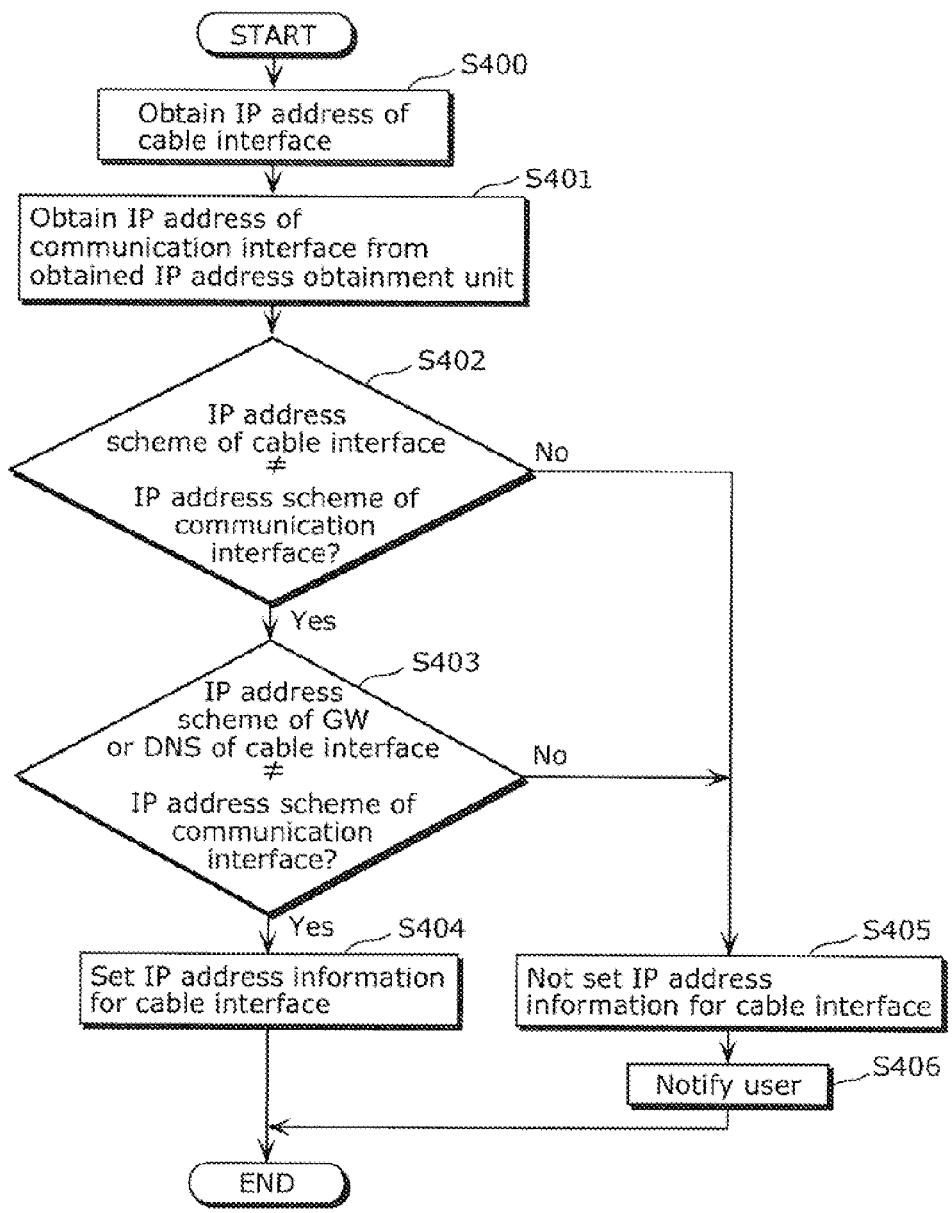
FIG. 7 is a flowchart showing an operation of an information processing terminal device according to the fourth embodiment.

The fourth embodiment describes, referring to the flowchart of FIG. 7, behavior of the information processing terminal device 1 at the time when the cable interface 3 obtains an IP address in the case where the communication interface 2 has already obtained an IP address from the router device 13. The present fourth embodiment is different from the above first to third embodiments in that the IP address information is set for the cable interface 3 only when both of the GW information and the DNS information of the cable interface 3 are different from the IP address scheme of the communication interface 2. FIG. 7 is a flowchart showing an operation of an information processing terminal device according to the fourth embodiment. Now, suppose that the IP address which the communication interface 2 has already obtained is 10.78.45.22/24.

When the communication interface 2 obtains the IP address, then the IP address setting management unit 6 attempts to set, using the connection information obtainment unit 4, IP address information provided by DHCP, for the cable interface 3 (S400).

When the cable interface 3 attempts to obtain an IP address, the DHCP server 18 in the cable network attempts to assign the cable interface 3 with an IP address. After the IP address is received from the DHCP server 18, the IP address setting management unit 6 obtains the IP address of the communication interface 2 from the obtained IP address obtainment unit 8 (S401).

The IP address scheme determination unit 7 then determines, by comparison, whether or not the scheme of the IP address which the DHCP server 18 attempts to provide to the cable interface 3 is different from the scheme of the IP address of the communication interface 2 obtained by the obtained IP address obtainment unit 8 (S402). When the IP address which the DHCP server 18 attempts to provide to the cable interface 3 is 10.78.45.40/24, no IP address information is set for the communication interface 2 (S405) because the IP address has the same IP address scheme as the IP address of the communication interface 2 (No in S402). The IP address setting management unit 6 is an example of "in the case where the LAN interface is the first communication interface for which a corresponding one of the IP addresses has already been set, the IP address setting management unit configured to determine to set, for the second communication interface, neither the gateway information nor the DNS server information that is included in the connection information obtained later when the IP address scheme determination unit determines that the IP address obtained by the obtained IP address obtainment unit and at least one of the gateway information and the DNS server information that are included in the connection information obtained by the second communication interface that is the WAN interface have the same IP address scheme". The user notification unit 9 is then used to notify a user that no IP address information is set for the cable interface 3 (S406). The user notification unit 9 is an example of "a notification unit configured to notify a user that the IP address that is included in the connection information obtained later is not set for the second communication interface".

When the IP address which the DHCP server 18 attempts to provide to the cable interface 3 is 10.10.10.20/24, the processing proceeds to a next step because the IP address has a different IP address scheme from the IP address of the communication interface 2 (Yes in S402).

Next, the IP address scheme determination unit 7 compares each of the GW information and the DNS information which the DHCP server 18 provides for the cable interface 3, with the scheme of the IP address of the communication interface 2 obtained by the obtained IP address obtainment unit 8 (S403).

When either the GW information nor the DNS information which the DHCP server 18 attempts to provide to the cable interface 3 has the same IP address scheme as the IP address obtained by the communication interface 2 (No in S403), no IP address information is set for the cable interface 3 (S405). The IP address setting management unit 6 is an example of "the two communication interfaces are a Wide Area Network (WAN) interface and a Local Area Network (LAN) interface, and in the case where the LAN interface is the first communication interface for which a corresponding one of the IP addresses has already been set, the IP address setting management unit configured to determine to set, for the second communication interface, neither the gateway information nor the DNS server information that is included in the connection information obtained later when the IP address scheme determination unit determines that the IP address obtained by the obtained IP address obtainment unit and at least one of the gateway information and the DNS server information that are included in the connection information obtained by the second communication interface that is the WAN interface have the same IP address scheme". The user notification unit 9 is then used to notify a user that no IP address information is set for the cable interface 3 (S406).

When both of the GW information and the DNS information which the DHCP server 18 attempts to provide to the cable interface 3 have different IP address schemes from the IP address obtained by the communication interface 2 (Yes in S403), the IP address information is set for the cable interface 3 (S404).

The use of the above method ensures that the respective interfaces are always given the IP addresses with different schemes and that, when the information processing terminal device 1 receives services provided by a cable operator, the GW information and the DNS information that are set for the cable interface 3 never have the same IP address scheme as the IP address of the communication interface 2. This makes it possible to prevent data from being transmitted to the communication interface 2 in error when the information processing terminal device 1 receives services provided by a cable operator. It is to be noted that, when the GW information and the DNS information that are set for the cable interface 3 have the same IP address scheme as the IP address of the communication interface 2, the Internet connection via the cable network 11 is not available because no IP address information is set for the cable interface 3, and thus, only communication through the home network is available.

(Fifth Embodiment)

Figure 8:
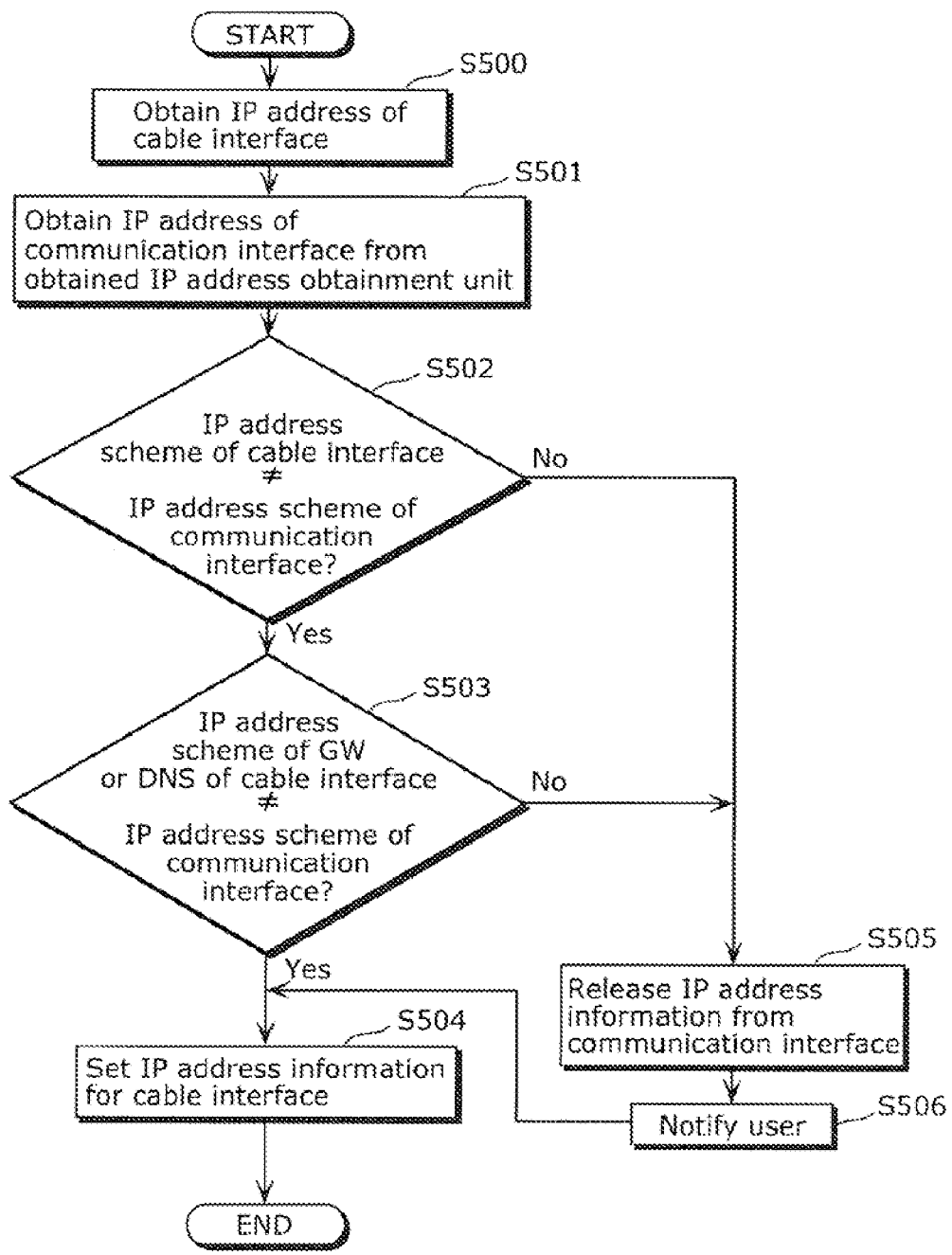
FIG. 8 is a flowchart showing an operation of an information processing terminal device according to the fifth embodiment.

The fifth embodiment describes, referring to the flowchart of FIG. 8, behavior of the information processing terminal device 1 at the time when the cable interface 3 obtains an IP address in the case where the communication interface 2 has already obtained an IP address from the router device 13. The present fifth embodiment is different from the above first to fourth embodiments in that the IP address information is set for the communication interface 2 only when both of the GW information and the DNS information of the cable interface 3 are different from the IP address scheme of the communication interface 2. FIG. 8 is a flowchart showing an operation of an information processing terminal device according to the fifth embodiment. Now, suppose that the IP address which the communication interface 2 has already obtained is 10.78.45.22/24.

When the communication interface 2 obtains the IP address, then the IP address setting management unit 6 attempts to set, using the connection information obtainment unit 4, an IP address provided by DHCP, for the cable interface 3. When the cable interface 3 attempts to obtain an IP address, the DHCP server 18 in the cable network 11 attempts to assign the cable interface 3 with an IP address. After the IP address is received from the DHCP server 18 (S500), the IP address setting management unit 6 obtains the IP address of the communication interface 2 from the obtained IP address obtainment unit 8 (S501).

The IP address scheme determination unit 7 then compares the scheme of the IP address which the DHCP server 18 attempts to provide to the cable interface 3, with the scheme of the IP address of the communication interface 2 obtained by the obtained IP address obtainment unit 8 (S502).

When the IP address which the DHCP server 18 attempts to provide to the cable interface 3 is 10.78.45.40/24, the IP address information which has been set for the communication interface 2 is released (S505) because the IP address has the same IP address scheme as the IP address of the communication interface 2 (No in S502). The user notification unit 9 is then used to notify a user that the IP address of the communication interface 2 is released (S506).

When the IP address which the DHCP server 18 attempts to provide to the cable interface 3 is 10.10.10.20/24, the processing proceeds to a next step because the IP address has a different IP address scheme from the IP address of the communication interface 2 (Yes in S502).

Next, the IP address scheme determination unit 7 compares each of the GW information and the DNS information which the DHCP server 18 provides for the cable interface 3, with the scheme of the IP address of the communication interface 2 obtained by the obtained IP address obtainment unit 8 (S503).

When either the GW information or the DNS information which the DHCP server 18 attempts to provide to the cable interface 3 has the same IP address scheme as the IP address obtained by the communication interface 2 (No in S503), the IP address setting management unit 6 releases the IP address information of the communication interface 2 by way of the connection information setting unit 5 (S505). The user notification unit 9 is then used to notify a user that the IP address of the communication interface 2 is released (S506). The IP address information is then set for the cable interface 3 (S504). The IP address setting management unit 6 is an example of "the two communication interfaces are a WAN interface and a LAN interface, and in the case where the LAN interface is the first communication interface for which a corresponding one of the IP addresses has already been set and the WAN interface is the second communication interface, the IP address setting management unit configured to determine to (i) release the IP address which has already been set for the first communication interface, and (ii) set, for the second communication interface, the IP address that is included in the connection information obtained later, when the IP address scheme determination unit determines that the IP address obtained by the obtained IP address obtainment unit and at least one of the gateway information and the DNS server information that are included in the connection information obtained by the second communication interface that is the WAN interface have the same IP address scheme".

When both of the GW information and the DNS information which the DHCP server 18 attempts to provide to the cable interface 3 have different IP address schemes from the IP address obtained by the communication interface 2 (Yes in S503), the IP address information is set for the cable interface 3 (S504).

The use of the above method ensures that the respective interfaces are always given the IP addresses with different schemes and that, when the information processing terminal device 1 receives services provided by a cable operator, the GW information and the DNS information that are set for the cable interface 3 never have the same IP address scheme as the IP address of the communication interface 2. With this, in the case where either the GW information or the DNS information of the cable interface 3 has the same IP address scheme as the IP address the communication interface 2, the home network is unavailable via the communication interface 2 while the information processing terminal device 1 receives services provided by a cable operator, but data can be prevented from being transmitted to the communication interface 2 in error.

(Sixth Embodiment)

The sixth embodiment describes, referring to the flowchart of FIG. 9, behavior of the information processing terminal device 1 at the time when the communication interface 2 obtains an IP address in the case where the cable interface 3 has already obtained an IP address from the DHCP server 18. The present sixth embodiment is different from the above first to fifth embodiments in that the IP address information is set for the communication interface 2 only when both of the GW information and the DNS information of the cable interface 3 are different from the IP address scheme of the communication interface 2. FIG. 9 is a flowchart showing an operation of the information processing terminal device according to the sixth embodiment.

Now, suppose that the IP address which the cable interface 3 has already obtained is 10.78.45.22/24. When the cable interface 3 obtains the IP address, then the IP address setting management unit 6 attempts to set, using the connection information obtainment unit 4, IP address information provided by DHCP, for the communication interface 2 (S600).

When the communication interface 2 attempts to obtain an IP address, the router device 13 attempts to assign the communication interface 2 with an IP address. After the IP address is received from the router device 13, the IP address setting management unit 6 obtains the IP address of the cable interface 3 from the obtained IP address obtainment unit 8 (S601).

The IP address scheme determination unit 7 then compares the scheme of the IP address which the router device 13 attempts to provide to the communication interface 2, with the scheme of the IP address of the cable interface 3 obtained by the obtained IP address obtainment unit 8 (S602).

When the IP address which the router device 13 attempts to provide to the communication device 2 is 10.78.45.40/24, no IP address information is set for the communication interface 2 (S605) because the IP address has the same IP address scheme as the IP address of the cable interface 3 (No in S602). The user notification unit 9 is then used to notify a user that no IP address information is set for the communication interface 2 (S606).

When the IP address which the router device 13 attempts to provide to the communication interface 2 is 10.10.10.20/24, the processing proceeds to a next step because the IP address has a different IP address scheme from the IP address of the cable interface 3 (Yes in S602).

Furthermore, the IP address scheme determination unit 7 compares the scheme of the IP address which the router device 13 provides for the communication interface 2, with each of the GW information and the DNS information of the cable interface 3 which have been obtained by the obtained IP address obtainment unit 8 (S603).

When the IP address which the router device 13 attempts to provide to the communication interface 2 has the same IP address scheme as at least one of the GW information and the DNS information obtained by the cable interface 3 (No in S603), no IP address information is set for the communication interface 2 (S605). The user notification unit 9 is then used to notify a user that no IP address information is set for the communication interface 2 (S606).

When the IP address which the router device 13 attempts to provide to the communication interface 2 has a different IP address scheme from both of the GW information and the DNS information obtained by the cable interface 3 (Yes in S603), the IP address information provided from the router device 13 is set for the communication interface 2 (S604).

The use of the above method ensures that the respective interfaces are always given the IP addresses with different schemes and that, when the information processing terminal device 1 receives services provided by a cable operator, the GW information and the DNS information that are set for the cable interface 3 never have the same IP address scheme as the IP address of the communication interface 2, with the result that data can be prevented from being transmitted to the communication interface 2 in error.

Thus, these methods eliminate the need for the processing of determining content of a service to be executed and then selecting a communication interface, and make it possible to select an appropriate communication interface with only the IP processing provided by a standard OS. Moreover, this leads to a low cost for mounting as well as a low software processing load.

Although the above first to sixth embodiments describe the two interfaces, namely, the communication interface 2 and the cable interface 3, the number of interfaces is set to two in the above embodiments merely in order to simplify explanation and therefore, the number of communication interfaces 2 in the information processing terminal device 1 according to an implementation of the present invention is not limited to two illustrated above, but may also be three or more. Furthermore, the interfaces in the information processing terminal device do not have to be a combination of the communication interface 2 and the cable interface 3. In this case, between the interface which has received a connection request and each of the interfaces already assigned with respective IP addresses, it is determined whether or not the IP address included in connection information obtained in response to the connection request has a different scheme from the IP addresses already assigned to the other interfaces, and when there is the same IP address scheme, then setting of the connection information is performed in the above method for the interface which has received the connection request and the interface already assigned with the IP address having the same scheme.

Furthermore, although the above embodiments describe the case where only the cable interface 3 is connected to a particular server in the cable network 11, the present invention is not limited to the case, and the communication interface 2, specifically, a LAN interface, may be set to connect to the communication carrier Internet via the router device 13. In this case, a control is performed such that the LAN interface corresponds to the cable interface 3 explained in the above embodiments, and the cable interface 3 corresponds to the communication interface 2 in the above embodiments. For example, in the case of the third embodiment, when the LAN interface obtains connection information from the DHCP server in a communication carrier Internet 12 via the router device 13 and thereby accesses the server, for example, neither the GW information nor the DNS information is set for the cable interface 3, and so on. In another example corresponding to the fourth embodiment, it may be such that, when it is determined that the IP address which the router device 13 assigns the LAN interface has the same IP address scheme as at least one of the GW information and the DNS server information of the cable interface 3 or the WAN interface, no connection information is set for the LAN interface. The IP address setting management unit 6 is an example of "the two communication interfaces are a WAN interface and a LAN interface, and in the case where the WAN interface is the first communication interface for which a corresponding one of the IP addresses has already been set and the LAN interface is the second communication interface, the IP address setting management unit configured to determine not to set, for the second communication interface, the IP address obtained later, when the IP address scheme determination unit determines that the IP address which a router assigns the second communication interface after assigning the first communication interface and at least one of the gateway information and the DNS server information which have already been set for the first communication interface have the same IP address scheme".

It may also be such that the interface for which an IP address is set is determined according to content of an application which the information processing terminal device 1 is executing or is about to execute. More specifically, even in the case where no IP address is set for the LAN interface because the IP address has the same scheme as the IP address already assigned to the WAN interface, this is the case only at the time of setting the initial IP address, and for actual execution of the application, an IP address is set, with priority, for the communication interface for the application to be executed. For example, in the case where the WAN interface has already been given an IP address when the device is turned on, no IP address is set for the LAN interface when the IP address obtained by the LAN interface has the same scheme. However, in execution of a LAN application (DLNA), no WAN application operates and therefore, the IP address of the WAN interface is released so that an IP address is set for the LAN interface. The IP address setting management unit 6 is an example of "when the IP address scheme determination unit determines that the IP address which a router assigns one of the two communication interfaces and at least one of the gateway information and the DNS server information that are included in the connection information obtained by the other one of the two communication interfaces have the same IP address scheme, the IP address setting management unit configured to determine for which of the two communication interfaces a corresponding one of the IP addresses is to be set, according to which network an application to be executed is provided from". Furthermore, the IP address setting management unit 6 is an example of "in the case where the two communication interfaces are a WAN interface and a LAN interface, a corresponding one of the IP addresses, the gateway information, and the DNS server information has already been set for the WAN interface, and the router then assigns a corresponding one of the IP addresses to the LAN interface, when the IP address scheme determination unit determines that the IP address which the router assigns the LAN interface and at least one of the gateway information and the DNS server information which have already been set for the WAN interface have the same IP address scheme, the IP address setting management unit configured to determine to (i) release the IP address which has already been set for the WAN interface and (ii) set, for the LAN interface, the IP address obtained later, when the information processing terminal device executes a LAN application".

Respective functional blocks in a block diagram (FIG. 2 etc.) are implemented typically as an integrated circuit or LSI. These may be each provided on a single chip, and part or all of them may be formed into a single chip. For example, the functional blocks other than the memory may be formed into a single chip.

Although an LSI is mentioned in the above, this may be referred to as IC, system LSI, super LSI, or ultra LSI, depending on integration, density.

Furthermore, the circuit integration is not limited to the LSI and may be achieved by a dedicated circuit or a general-purpose processor. A field programmable gate array (FPGA) that is programmable after an LSI is manufactured and a reconfigurable processor that is capable of reconfiguring connection and setting of circuit cells inside an LSI may be used.

Furthermore, if any technique for circuit integration which replaces the LSI emerges owing to development of the semiconductor technology or another derivative technology, such a technique may of course be used to integrate the functional blocks. Application of biotechnology or the like is probable.

It may also be possible that, of the functional blocks, only a unit in which data to be encoded or decoded is stored is excluded from the integration into a single chip and thus provided in another structure.

INDUSTRIAL APPLICABILITY

The information processing terminal device according to the present invention is useful for a system which needs to select an appropriate interface in a device which includes a plurality of communication interfaces.

REFERENCE SIGNS LIST

1 Information, processing terminal device
2, 911, 912 Communication interface
3 Cable interface
4 Connection information obtainment unit
5 Connection information setting unit
6 IP address setting management unit
7 IP address scheme determination unit
8 Obtained IP address obtainment unit
9 User notification unit
10 Storage unit
11 Cable network
12 Communication carrier Internet
13 Router device
14 PC
15 Video display terminal
16 TV
17 House
18, 24, 34 DHCP server
20, 30 Base station
21, 31 Network
22, 32 DNS server
23, 33 WWW server
910 Information communication terminal device

The invention claimed is:

1. An information processing terminal device including a plurality of communication interfaces connectable to networks, said information processing terminal device comprising:
   a plurality of communication interfaces that request connection to networks different from each other and obtain, from Dynamic Host Configuration Protocol (DHCP) servers corresponding to the respective networks, connection information that includes Internet Protocol (IP) addresses and is necessary for the connection to the networks;
   an IP address scheme determination unit configured to determine whether or not the IP addresses that are included in the connection information obtained by two of said communication interfaces are IP addresses having the same address scheme; and
   a connection information setting unit configured to:
   (i) set, for only one of said two communication interfaces, a corresponding one of the IP addresses when said IP address scheme determination unit determines that the IP addresses that are included in the connection information obtained by said two communication interfaces are the IP addresses having the same address scheme, and
   in the case where one of said two communication interfaces is a communication interface defined as a LAN interface, (ii) set, for said LAN interface, neither gateway information nor Domain Name System (DNS) server information that is necessary for said LAN interface to connect to an external server and is included in the connection information for said LAN interface, even when said IP address scheme determination unit determines that the IP addresses that are included in the connection information obtained by said two communication interfaces are the IP addresses having different address schemes.

2. The information processing terminal device according to claim 1,
   wherein said IP address scheme determination unit is configured to (i) obtain subnet addresses for said two communication interfaces, (ii) compare the obtained subnet addresses, and (iii) determine the two IP addresses as having the same address scheme when the subnet addresses have an inclusion relation, the subnet addresses each being obtained by a logical AND operation between a corresponding one of the IP addresses and a subnet mask corresponding to the IP address.

3. The information processing terminal device according to claim 1, further comprising:
   in the case where, of said two communication interfaces, a communication interface for which a corresponding one of the IP addresses is set first is referred to as a first communication interface, and a communication interface which obtains the connection information after said first communication interface does is referred to as a second communication interface,
   an obtained IP address obtainment unit configured to obtain, from said first communication interface, the IP address which has already been set for said first communication interface; and
   an IP address setting management unit configured to determine a method of setting a corresponding one of the IP addresses for only one of said two communication interfaces when said IP address scheme determination unit determines that the IP address obtained by said obtained IP address obtainment unit and the IP address obtained by said second communication interface are the IP addresses having the same address scheme,
   wherein said connection information setting unit is configured to set the IP addresses and the connection information for said communication interfaces according to the method determined by said IP address setting management unit.

4. The information processing terminal device according to claim 3,
   wherein said IP address setting management unit is configured to determine not to set the obtained IP address for said second communication interface when said IP address scheme determination unit determines that the IP address obtained by said obtained IP address obtainment unit and the IP address that is included in the connection information obtained by said second communication interface have the same IP address scheme.

5. The information processing terminal device according to claim 4,
   wherein said IP address setting management unit is further configured to determine to set the obtained IP address also for said second communication interface when said IP address scheme determination unit determines that the IP address obtained by said obtained IP address obtainment unit and the IP address that is included in the connection information obtained by said second communication interface do not have the same IP address scheme.

6. The information processing terminal device according to claim 4, further comprising
   a notification unit configured to notify a user that the IP address that is included in the connection information obtained later is not set for said second communication interface.

7. The information processing terminal device according to claim 3,
   wherein, when said IP address scheme determination unit determines that the IP address obtained by said obtained IP address obtainment unit and the IP address that is included in the connection information obtained by said second communication interface have the same IP address scheme, said IP address setting management unit is configured to (i) release the IP address obtained by said obtained IP address obtainment unit, from said first communication interface for which the IP address obtained by said obtained IP address obtainment unit has been set, and (ii) determine to set, for said second communication interface, the IP address included in the obtained connection information.

8. The information processing terminal device according to claim 7, further comprising
   a notification unit configured to notify a user that the IP address that is included in the connection information and has been set for said first communication interface is released.

9. The information processing terminal device according to claim 3,
   wherein, in the case where said communication interface defined as said LAN interface is said first communication interface for which a corresponding one of the IP addresses is set first, said IP address setting management unit is configured to determine to set, for said first communication interface, neither the gateway information nor the Domain Name System (DNS) server information that is necessary for said first communication interface to connect to an external server and is included in the connection information for said first communication interface.

10. The information processing terminal device according to claim 3,
wherein said two communication interfaces are a Wide Area Network (WAN) interface and a Local Area Network (LAN) interface, and in the case where said LAN interface is said first communication interface for which a corresponding one of the IP addresses has already been set, said IP address setting management unit is configured to determine to set, for said second communication interface, neither the gateway information nor the DNS server information that is included in the connection information obtained later when said IP address scheme determination unit determines that the IP address obtained by said obtained IP address obtainment unit and at least one of the gateway information and the DNS server information that are included in the connection information obtained by said second communication interface that is said WAN interface have the same IP address scheme.

11. The information processing terminal device according to claim 3,
wherein said two communication interfaces are a WAN interface and a LAN interface, and in the case where said LAN interface is said first communication interface for which a corresponding one of the IP addresses has already been set and said WAN interface is said second communication interface, said IP address setting management unit is configured to determine to (i) release the IP address which has already been set for said first communication interface, and (ii) set, for said second communication interface, the IP address that is included in the connection information obtained later, when said IP address scheme determination unit determines that the IP address obtained by said obtained IP address obtainment unit and at least one of the gateway information and the DNS server information that are included in the connection information obtained by said second communication interface that is said WAN interface have the same IP address scheme.

12. The information processing terminal device according to claim 3,
wherein said two communication interfaces are a WAN interface and a LAN interface, and in the case where said WAN interface is said first communication interface for which a corresponding one of the IP addresses has already been set and said LAN interface is said second communication interface, said IP address setting management unit is configured to determine not to set, for said second communication interface, the IP address obtained later, when said IP address scheme determination unit determines that the IP address which a router assigns said second communication interface after assigning said first communication interface and at least one of the gateway information and the DNS server information which have already been set for said first communication interface have the same IP address scheme.

13. The information processing terminal device according to claim 1,
wherein, when said IP address scheme determination unit determines that the IP address which a router assigns one of said two communication interfaces and at least one of the gateway information and the DNS server information that are included in the connection information obtained by the other one of said two communication interfaces have the same IP address scheme, said IP address setting management unit is configured to determine for which of said two communication interfaces a corresponding one of the IP addresses is to be set, according to which network an application to be executed is provided from.

14. The information processing terminal device according to claim 13,
wherein, in the case where said two communication interfaces are a WAN interface and a LAN interface, a corresponding one of the IP addresses, the gateway information, and the DNS server information has already been set for said WAN interface, and the router then assigns a corresponding one of the IP addresses to said LAN interface, when said IP address scheme determination unit determines that the IP address which the router assigns said LAN interface and at least one of the gateway information and the DNS server information which have already been set for said WAN interface have the same IP address scheme, said IP address setting management unit is configured to determine to (i) release the IP address which has already been set for said WAN interface and (ii) set, for said LAN interface, the IP address obtained later, when said information processing terminal device executes a LAN application.

15. A network connection method performed by an information processing terminal device including a plurality of communication interfaces connectable to networks, said network connection method comprising:
requesting, by the plurality of communication interfaces, connection to the networks different from each other and obtaining, from Dynamic Host Configuration Protocol (DHCP) servers corresponding to the respective networks, connection information that includes Internet Protocol (IP) addresses and is necessary for the connection to the networks;
determining, by an IP address scheme determination unit, whether or not the IP addresses that are included in the connection information obtained by two of the communication interfaces are IP addresses having the same address scheme; and
(i) setting, by a connection information setting unit, for only one of the two communication interfaces, a corresponding one of the IP addresses when the IP address scheme determination unit determines that the IP addresses that are included in the connection information obtained by the two communication interfaces are the IP addresses having the same address scheme, and
in the case where one of the two communication interfaces is a communication interface defined as a LAN interface, (ii) setting, by the connection information setting unit, for the LAN interface, neither gateway information nor Domain Name System (DNS) server information that is necessary for the LAN interface to connect to an external server and is included in the connection information for the LAN interface, even when the IP address scheme determination unit determines that the IP addresses that are included in the connection information obtained by the two communication interfaces are the IP addresses having different address schemes.

16. An integrated circuit including a plurality of communication interfaces connectable to networks, said integrated circuit comprising:
a plurality of communication interfaces that request connection to networks different from each other and obtain, from Dynamic Host Configuration Protocol (DHCP) servers corresponding to the respective networks, connection information that includes Internet Protocol (IP) addresses and is necessary for the connection to the networks;

an IP address scheme determination unit configured to determine whether or not the IP addresses that are included in the connection information obtained by two of said communication interfaces are IP addresses having the same address scheme; and a connection information setting unit configured to:

(i) set, for only one of said two communication interfaces, a corresponding one of the IP addresses when said IP address scheme determination unit determines that the IP addresses that are included in the connection information obtained by said two communication interfaces are the IP addresses having the same address scheme, and in the case where one of said two communication interfaces is a communication interface defined as a LAN interface, (ii) set, for said LAN interface, neither gateway information nor Domain Name System (DNS) server information that is necessary for said LAN interface to connect to an external server and is included in the connection information for said LAN interface, even when said IP address scheme determination unit determines that the IP addresses that are included in the connection information obtained by said two communication interfaces are the IP addresses having different address schemes.

17. A non-transitory computer-readable recording medium for use in a computer, said recording medium storing a computer program for an information processing terminal device including a plurality of communication interfaces connectable to networks, the computer program causing the computer to execute:

requesting, by the plurality of communication interfaces, connection to the networks different from each other and obtaining, from Dynamic Host Configuration Protocol (DHCP) servers corresponding to the respective networks, connection information that includes Internet Protocol (IP) addresses and is necessary for the connection to the networks;

determining, by an IP address scheme determination unit, whether or not the IP addresses that are included in the connection information obtained by two of the communication interfaces are IP addresses having the same address scheme; and (i) setting, by a connection information setting unit, for only one of the two communication interfaces, a corresponding one of the IP addresses when the IP address scheme determination unit determines that the IP addresses that are included in the connection information obtained by the two communication interfaces are the IP addresses having the same address scheme, and in the case where one of the two communication interfaces is a communication interface defined as a LAN interface, (ii) setting, by the connection information setting unit, for the LAN interface, neither gateway information nor Domain Name System (DNS) server information that is necessary for the LAN interface to connect to an external server and is included in the connection information for the LAN interface, even when the IP address scheme determination unit determines that the IP addresses that are included in the connection information obtained by the two communication interfaces are the IP addresses having different address schemes.

* * * * *